US011163447B2

(12) United States Patent
Khurange et al.

(10) Patent No.: US 11,163,447 B2
(45) Date of Patent: Nov. 2, 2021

(54) DEDUPE FILE SYSTEM FOR BULK DATA MIGRATION TO CLOUD PLATFORM

(71) Applicants: Ashish Govind Khurange, Pune (IN); Smita Govind Khurange, Pune (IN); Supriya Sitaram Dere, Pune (IN); Dhiraj Ashok Akude, Pune (IN); Sachin Baban Durge, Pune (IN); Kuldeep Sureshrao Nagarkar, Pune (IN); Ravender Goyal, Saratoga, CA (US)

(72) Inventors: Ashish Govind Khurange, Pune (IN); Smita Govind Khurange, Pune (IN); Supriya Sitaram Dere, Pune (IN); Dhiraj Ashok Akude, Pune (IN); Sachin Baban Durge, Pune (IN); Kuldeep Sureshrao Nagarkar, Pune (IN); Ravender Goyal, Saratoga, CA (US)

( * ) Notice: Subject to any disclaimer, the term of this patent is extended or adjusted under 35 U.S.C. 154(b) by 0 days.

(21) Appl. No.: 15/694,829

(22) Filed: Sep. 3, 2017

(65) Prior Publication Data
US 2019/0073131 A1 Mar. 7, 2019

(51) Int. Cl.
G06F 3/06 (2006.01)
G06F 16/11 (2019.01)
G06F 16/174 (2019.01)

(52) U.S. Cl.
CPC .......... G06F 3/0608 (2013.01); G06F 3/067 (2013.01); G06F 3/0607 (2013.01);
(Continued)

(58) Field of Classification Search
CPC .... G06F 3/0608; G06F 3/0619; G06F 3/0641; G06F 3/0647; G06F 3/0665;
(Continued)

(56) References Cited

U.S. PATENT DOCUMENTS 5,822,780 A * 10/1998 Schutzman ......... G06F 16/9017
711/165
7,191,290 B1 * 3/2007 Ackaouy ............. G06F 16/9574
711/119
(Continued)

Primary Examiner — Charles Rones
Assistant Examiner — Tong B. Vo

(57) ABSTRACT

In one aspect, a computer-implemented method useful for bulk data migration with a dedupe file system includes the step of providing a data-transfer appliance, wherein the data-transfer appliance comprises a specified number of hard drive data disks configured in a specified number of RAID (redundant array of independent disks) volumes in each RAID group. The computer-implemented method includes the step of creating a single dedupe mountpoint on the data-transfer appliance for a dedupe process, wherein the dedupe process communicates only with the single dedupe mountpoint. The computer-implemented method includes the step of creating a single namespace of all RAID volumes under the single dedupe mountpoint. The computer-implemented method includes the step of creating a scalable namespace for deduplication without a volume manager. The computer-implemented method includes the step of providing n-number of writer threads, wherein each writer-thread works with one RAID group assignment and the writer-threads are evenly distributed.

16 Claims, 6 Drawing Sheets

(52) U.S. Cl.
CPC .......... *G06F 3/0619* (2013.01); *G06F 3/0641* (2013.01); *G06F 3/0647* (2013.01); *G06F 3/0665* (2013.01); *G06F 3/0689* (2013.01); *G06F 16/119* (2019.01); *G06F 16/1748* (2019.01)

(58) Field of Classification Search
CPC ............. G06F 3/0689; G06F 17/30079; G06F 17/30156; G06F 3/067; G06F 3/0607; G06F 16/119; G06F 16/1748
See application file for complete search history.

(56) References Cited

U.S. PATENT DOCUMENTS

| | | | | |
|---|---|---|---|---|
| 8,527,586 | B1* | 9/2013 | Becher | H04L 69/18 709/203 |
| 9,026,499 | B1* | 5/2015 | Rajimwale | G06F 16/972 707/674 |
| 9,348,569 | B1* | 5/2016 | Chopra | G06F 9/44505 |
| 2006/0028805 | A1* | 2/2006 | Hidaka | G11B 33/126 361/754 |
| 2008/0080131 | A1* | 4/2008 | Hori | G06F 3/0689 361/679.31 |
| 2010/0114889 | A1* | 5/2010 | Rabii | G06F 16/1824 707/737 |
| 2010/0223539 | A1* | 9/2010 | Nowoczynski | G06F 3/067 714/807 |
| 2012/0011562 | A1* | 1/2012 | Slater | G06F 16/176 726/1 |
| 2012/0084523 | A1* | 4/2012 | Littlefield | G06F 11/1453 711/162 |
| 2012/0331021 | A1* | 12/2012 | Lord | G06F 16/174 707/826 |
| 2013/0339316 | A1* | 12/2013 | Hirsch | G06F 3/0608 707/692 |
| 2015/0293699 | A1* | 10/2015 | Bromley | G06F 3/0649 711/161 |
| 2016/0050146 | A1* | 2/2016 | Henderson | H04L 67/1097 370/392 |
| 2016/0070482 | A1* | 3/2016 | Colgrove | G06F 3/0608 711/114 |
| 2016/0232177 | A1* | 8/2016 | Khurange | G06F 11/1448 |
| 2017/0017547 | A1* | 1/2017 | Broede | G06F 3/0608 |
| 2017/0123699 | A1* | 5/2017 | Ohyama | G06F 3/0665 |
| 2017/0177222 | A1* | 6/2017 | Singh | G06F 13/4265 |

* cited by examiner

DEDUPE FILE SYSTEM FOR BULK DATA MIGRATION TO CLOUD PLATFORM

BACKGROUND

Field of the Invention

This application relates generally to data storage, and more specifically to a system, article of manufacture and method of dedupe file system for bulk data migration.

Description of the Related Art

An enterprise may wish to implement the copying and archiving of computer data so it may be used to restore the original after a data loss event. For example, the enterprise may wish to migrate servers and the server data to a cloud-computing environment. Current methods may lack functionalities that enable the migration of servers to a cloud-computing environment. Many current methods can only be used to migrate archived data in the form of files. Accordingly, improvements to migrating applications to a cloud-computing environment can be implemented.

BRIEF SUMMARY OF THE INVENTION

In one aspect, a computer-implemented method useful for bulk data migration with a dedupe file system includes the step of providing a data-transfer appliance, wherein the data-transfer appliance comprises a specified number of hard drive data disks configured in a specified number of RAID (redundant array of independent disks) volumes in each RAID group. The computer-implemented method includes the step of creating a single dedupe mountpoint on the data-transfer appliance for a dedupe process, wherein the dedupe process communicates only with the single dedupe mountpoint. The computer-implemented method includes the step of creating a single namespace of all RAID volumes under the single dedupe mountpoint. The computer-implemented method includes the step of creating a scalable namespace for deduplication without a volume manager. The computer-implemented method includes the step of providing n-number of writer threads, wherein each writer-thread works with one RAID group assignment and the writer-threads are evenly distributed across all the RAID groups.

Figure 1:
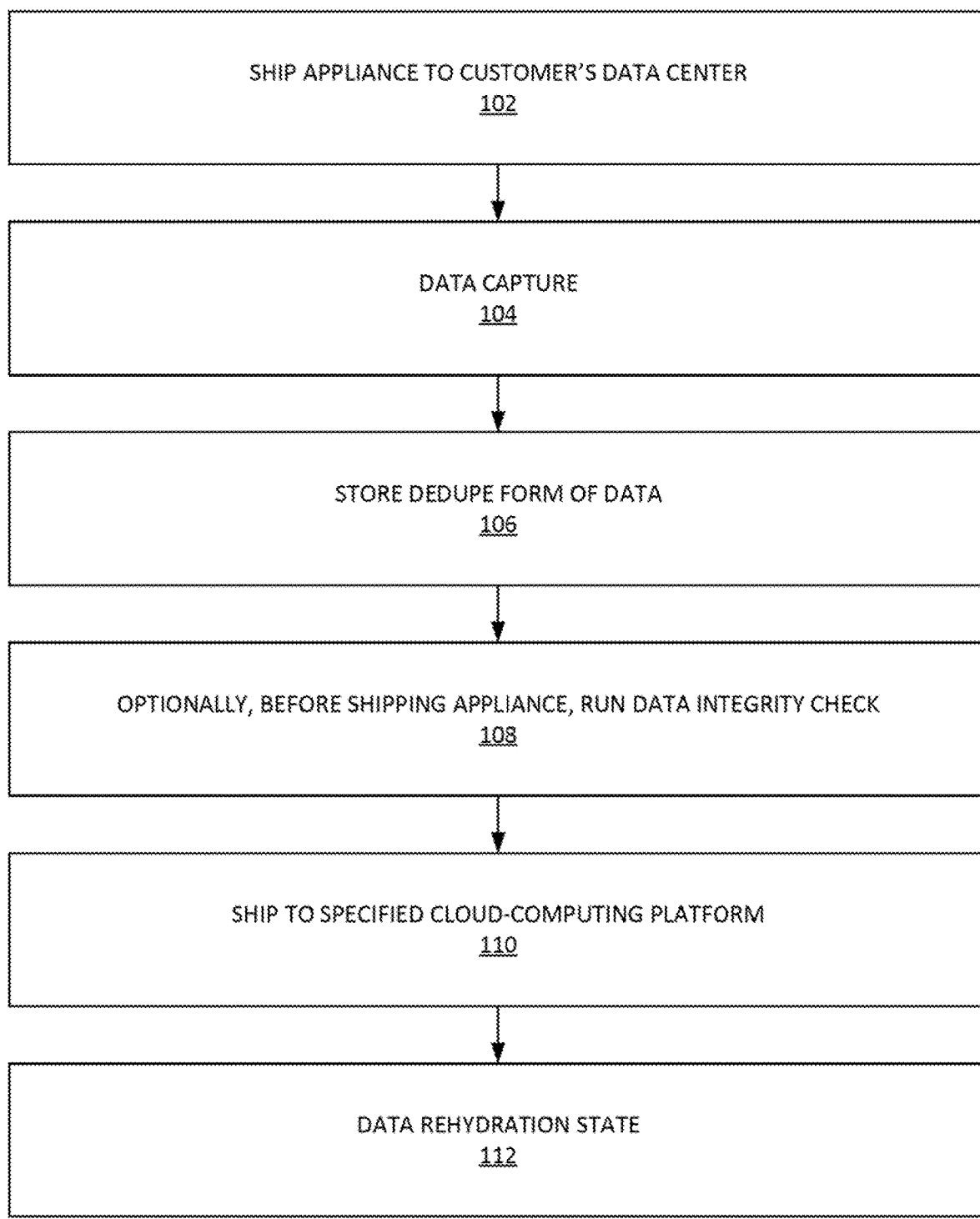
FIG. 1 illustrates an example process for migrating large amounts of data to a cloud-computing environment with an appliance, according to some embodiments.

The Figures described above are a representative set, and are not exhaustive with respect to embodying the invention.

DESCRIPTION

Disclosed are a system, method, and article of manufacture for dedupe file system for bulk data migration. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

Backup image (or image) can include copies of programs, system settings, files, etc. It can be a complete system backup that can be used for restore operations.

Chunk can be a fragment of information.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Data deduplication (e.g. 'dedupe', 'deduplication') can refer to the elimination of redundant data.

Dedupe storage network can be represented in the form of a graph topology, where node represents dedupe storage node, and the directed edge represent the data replication path. In dedupe storage network data is replicated in dedupe preserving manner. A data chunk which is present at a dedupe storage node is never replicated to that same storage node by any other storage node in the dedupe storage network.

ext4 (fourth extended filesystem) is a journaling file system for Linux®.

Fingerprint can uniquely identify data.

Logical Volume Manager (LVM) is a device mapper target that provides logical volume management for the Linux kernel.

RAID (redundant array of independent disks) is a data storage virtualization technology that combines multiple physical disk drive components into a single logical unit for the purposes of data redundancy, performance improvement, or both. Each RAID level CAN provide a different balance among various goals: reliability, availability, performance, and capacity.

Wide area network (WAN) can be a telecommunications network or computer network that extends over a large geographical distance.

Data rehydration is the process of extracting data in its original format from a dedupe storage. Data rehydration step involves decrypting, decompressing and undeduping the data stored in dedupe format.

Additional example definitions are provided herein.

Example Methods

FIG. 1 illustrates an example process 100 for migrating large amounts of data to a cloud-computing environment with an offline data-transfer appliance, according to some embodiments. The data-transfer appliance (hereafter 'appliance') can include specialized software (e.g. for implementing the various processes provided infra, etc.), an operating system, one or more CPU's, memory (e.g. RAM), data storage systems, etc. In some examples, the data storage systems can store a petabyte of data. The appliance can include various interfaces for plug-in network cables. The appliance can perform link aggregation. The appliance can assign itself an IP address. A customer can access/manage the appliance using a web browser via a portal.

More specifically, in step 102, process 100 can ship appliance to customer's data center. In step 104, process 100 can implement data capture 104. Two methods of data capture can be implemented. A first method can be workstation capture. With the workstation capture, a user downloads a capture utility on the workstation using an appliance web portal. In some examples, workstations can be both Windows® or Linux® based workstations. The capture utility can be used to capture the data available on the workstation. A second method of data capture can be appliance capture. The appliance capture method can export a Network File Share (NFS) SharePoint to appliance and then mount to the appliance as an NFS mountpoint. Then, the appliance can capture the data from the NFS mountpoint. The capture method involves reading data from the storage attached to the workstation. The storage attached to the workstation may be DAS (directly attached storage), NAS (network attached storage), SAN (storage area network), or any other type. The capture utility iterates through the file system, identifies the files to be captured, reads the file data and streams it to the appliance. For each file, metadata such as name, size, file attributes, access control lists and any other such information is streamed to the appliance. The capture utility creates a catalog of files successfully captured and streamed to the appliance. Appliance stores the captured data in dedupe form. Every unique data chunk is compressed and encrypted before writing on the storage device. The customer configures the encryption keys for the appliance, which are not stored on the appliance but in memory such that they are not available after the appliance shut down. Accordingly, only someone with the encryption keys can recover data from appliance.

In step 106, process 100 can store dedupe form of data in the appliance. In step 108, optionally, before shipping appliance, process 100 can run data integrity check. In step 110, process 100 can ship appliance to a specified cloud-computing platform access point. This can be performed by a third party and/or internal data ingest service that receives the appliance and connects it to a highspeed cloud network. Process 100 can then copy the data to the specified cloud-computing platform. This can be done without the encryption keys so the third party and/or internal data ingest service cannot determine meaning of the data. Step 110 can also create a staging bucket in the specified cloud-computing platform on a per customer basis. This can hold all the encrypted and compressed dedupe data such that a copy of the appliance is in cloud-based staging bucket. In step 112, process 100 can implement data rehydration. To recover the data in its original format, customer creates a destination storage bucket in cloud platform. The data rehydration process reads the dedupe data from the staging bucket, decrypts it, decompresses it and undedupes it and recover the data in its original format in the destination bucket.

Figure 2:
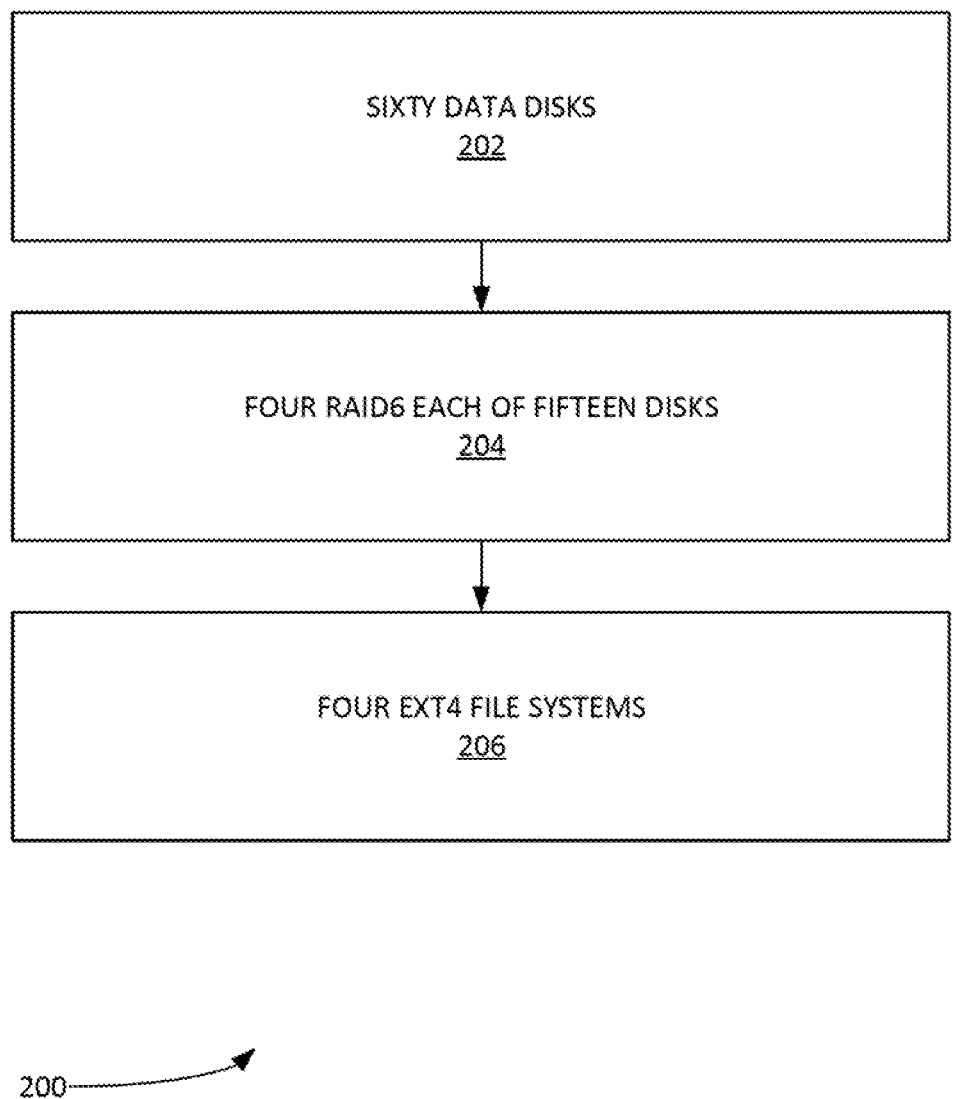
FIG. 2 illustrates an example process for accessing and/or managing an appliance, according to some embodiments.

The data-transfer appliance can have various storage capacity sizes (e.g. 100 Terabyte (TB), 500 TB, 1 Petabyte (PB), etc.). Based on the amount of data to be transferred to a cloud-computing platform, a customer can order the data-transfer appliance configured with a particular storage capacity. Further, each data-transfer appliance can include a large-number of hard disk drives (e.g. twenty hard disk drives, forty hard disk drives, sixty hard disk drives, one hundred and twenty hard disk drives etc.). A hard drive can fail at any time. Accordingly, it may be desirable to organize the hard drives in RAID1 or RAID5 or RAID6 type of RAID configurations. RAID1 (mirroring) provides the fault tolerance at the cost of reducing the storage capacity to half; hence it is not desirable for data-transfer appliance. RAID5 provides fault tolerance of one hard disk drive, whereas RAID6 provides fault tolerance of two hard disk drives. Because of the limited fault tolerance capability, organizing large number of hard disk drives (e.g. 60 or 120 hard drives) under a single RAID5 or RAID6 groups is not desirable. For the practical purpose maximum sixteen (16) hard disk drives are organized under a single RAID5 or RAID6 group. The hard drives can be divided into several smaller redundant RAID groups. For example, FIG. 2 illustrates an example process 200 of dividing sixty (60) hard drive data disks of an appliance into smaller RAID groupings, according to some embodiments. Sixty (60) hard drive data disks 202 can be provided. In step 204, process 200 can divide four RAID6 each of fifteen disks. One benefit of this is that out of each RAID group, there may be a two (2) disk failure tolerance. If two disks fail, and thirteen are still operable, the appliance can still function. In this way, the appliance has a tolerance of eight hard drives 206 (e.g. two hard drives per group).

Figure 3:
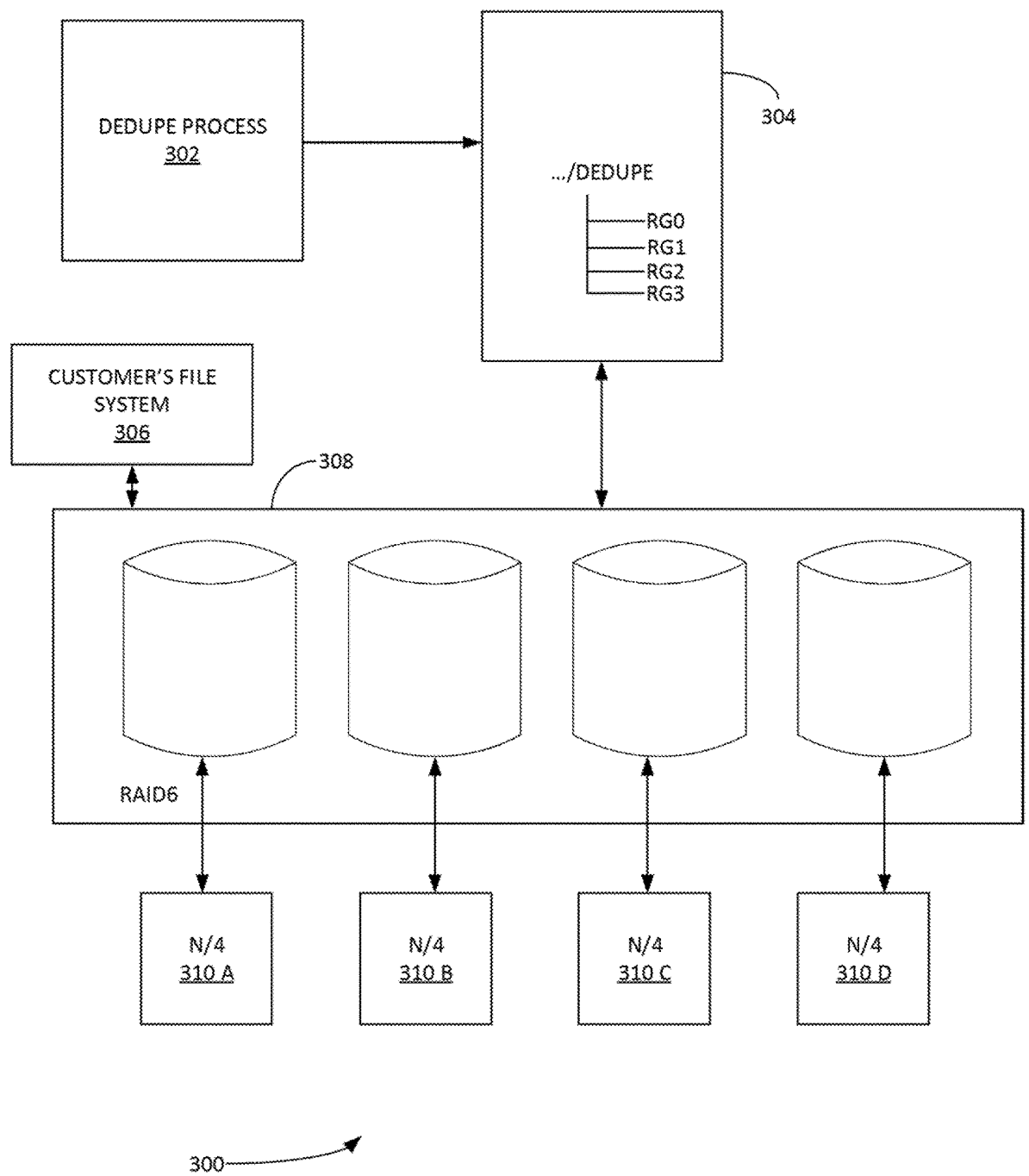
FIG. 3 illustrates an example process for data storage in an appliance using a data dedupe form of data, according to some embodiments.

FIG. 3 illustrates an example process 300 for an appliance with sixty (60) hard drive disks, according to some embodiments. The sixty (60) hard disk drives can be grouped into four (4) RAID6 groups 308. Each RAID6 group of 308 can have its own unique file system. For example, each RAID6 group can have its own ext4 file system. A single dedupe mountpoint can be created on the appliance for dedupe process 402. Process 400 can create several directories under the dedupe mountpoint 304. Directories 304 can be a flat hierarchy and each individual RAID group can have one of these directories as its mountpoint. In one example embodiment, in process 300, Dedupe process 302 communicates with the mountpoint only. Process 300 creates a single namespace of all RAID volumes under the single dedupe mountpoint. Accordingly, process 300 does not have a volume manager (e.g. an LVM, etc.). Process 300 can create a massively scalable namespace for deduplication without a volume manager. N-number of writer-threads (e.g. a thread in dedupe process which listens on socket for plain text data and dedupes it, and encrypts and compresses it before writing on the dedupe storage) 310 A-D can be provided. Each writer-thread of 310 A-D can work with one RAID group assignment and, thus, the writer-threads 310 A-D can be evenly distributed across all the RAID groups. Even distribution of writer threads across the RAID groups can ensure nearly equal storage usage across all the RAID groups.

Figure 4:
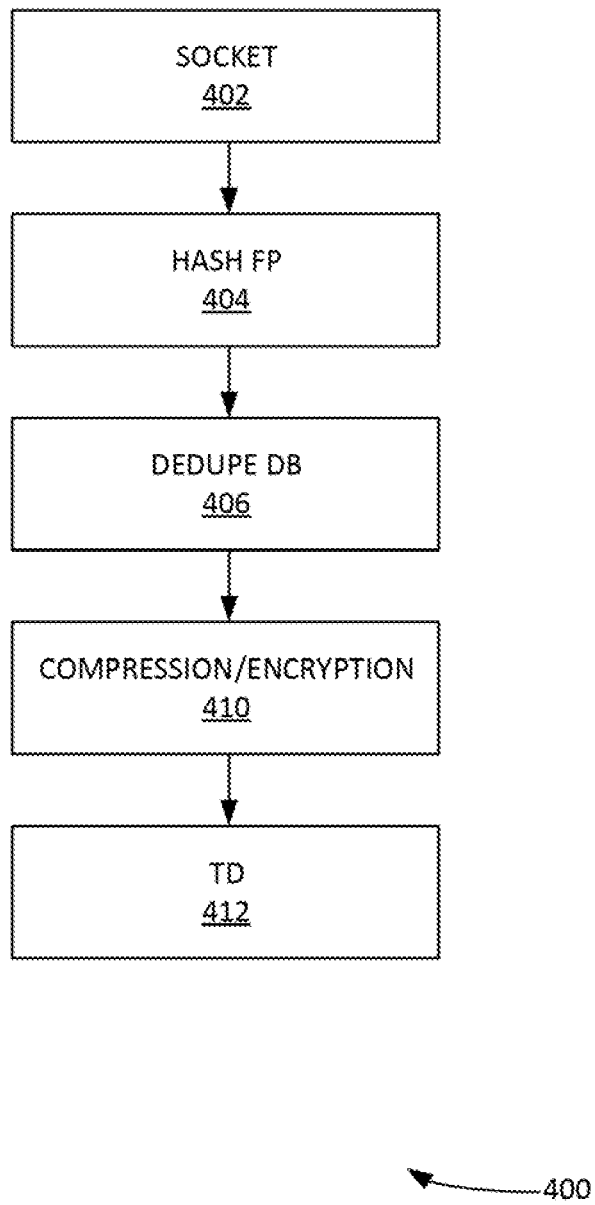
FIG. 4 illustrates an example process for shipping data to a cloud-computing platform from an appliance, according to some embodiments.

With the dedupe process, the dedupe chunk can be small enough such that the maximum deduplication parameter is reached. However, if there are small data chunks on storage disk, then the upload speed for data ingestion from the appliance to the staging bucket in cloud can be very slow. To have the optimum upload speed to staging bucket small dedupe chunks can be stitched together to create large segment files. FIG. 4 illustrates an example writer thread process 400, according to some embodiments. A writer thread can listen on a socket for a plain text data in step 402. The writer thread can find out the fingerprint of the plain text data by calculating the hash in step 404. The writer thread can check the finger print in the dedupe database (DB) to determine if it has seen this plain text before in step 406. If yes, then the write thread doesn't write. If no, then the writer thread can proceed to step 408 and implement compression operations. The writer thread implements encryption operations. The writer thread then writes dedupe chunk along with original finger print (e.g. to the applicable RAID group, etc.). This is the transformed data (TD) 410. The writer thread continues to append the transformed data to a segment file. In one example, the writer thread can keep appending the transformed data (TD) until the size of the segment file is greater than a specified size (e.g. eight gigabytes (8 GB), etc.). In this way, process 400 can create a larger size segment files.

Figure 5:
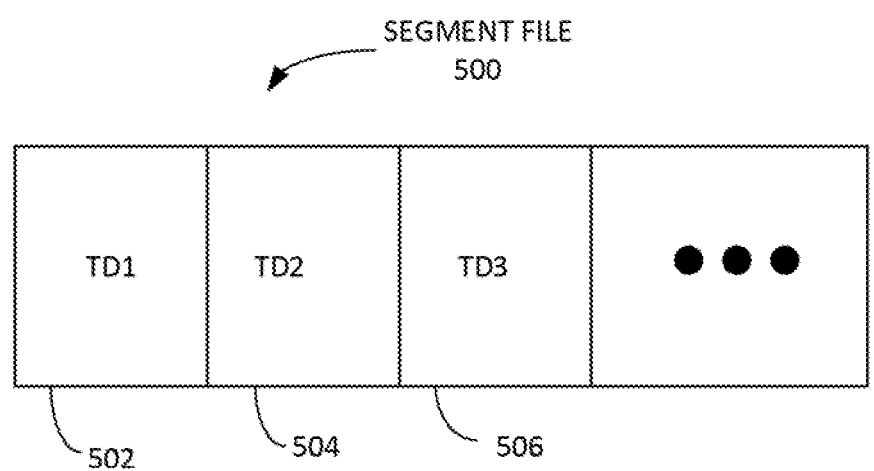
FIG. 5 illustrates an example process for data rehydration, according to some embodiments.

FIG. 5 illustrates an example segment file 500, according to some embodiments. Segment file 500 can include transformed data (TD) 502. TD 504 can be appended onto TD 502. TD 506 can be appended onto TD 504. This process can continue until segment file 500 is greater than a specified size. The optional data integrity check [108] relies on the format of the segment file. For each TO stored in a segment file, data integrity check decrypts, decompresses the dedupe chunk and generates the data in plain text format. Then calculates the hash of plain text data. Compares the hash value with the original fingerprint stored in TD. If the calculated has value and stored fingerprint matches the contents of TD are valid else the TD is corrupt. In case of a corrupt TD, all the backup images referring to the corrupt TD are marked corrupt. Corrupt marked backup images are not available for rehydration in the cloud.

Writer thread appends TD to the segment files. A segment file is used for appending TDs without closing it till it becomes sufficiently large in size. Where upon the writer thread closes segment file and opens another segment file to write TDs. Appending data without flushing the segment file poses threat of the data corruption. If writer thread pauses writing TD to segment file for flushing the segment file to storage disk it can have adverse impact on the write throughput of the data-transfer appliance. Accordingly, each writer thread can have two different segment files: an active segment file and a flusher segment file. In the active segment file, the incoming TD is appended. In the flusher segment file, process 400 tries to flush the file to the storage disk. After every fifteen (15) seconds (and/or other operating system (OS) time for data swiping) process 400 can swap both files. This can ensure reliability and protect against data corruption without compromising the write throughput of the data-transfer appliance.

Exemplary Computer Architecture and Systems

Figure 6:
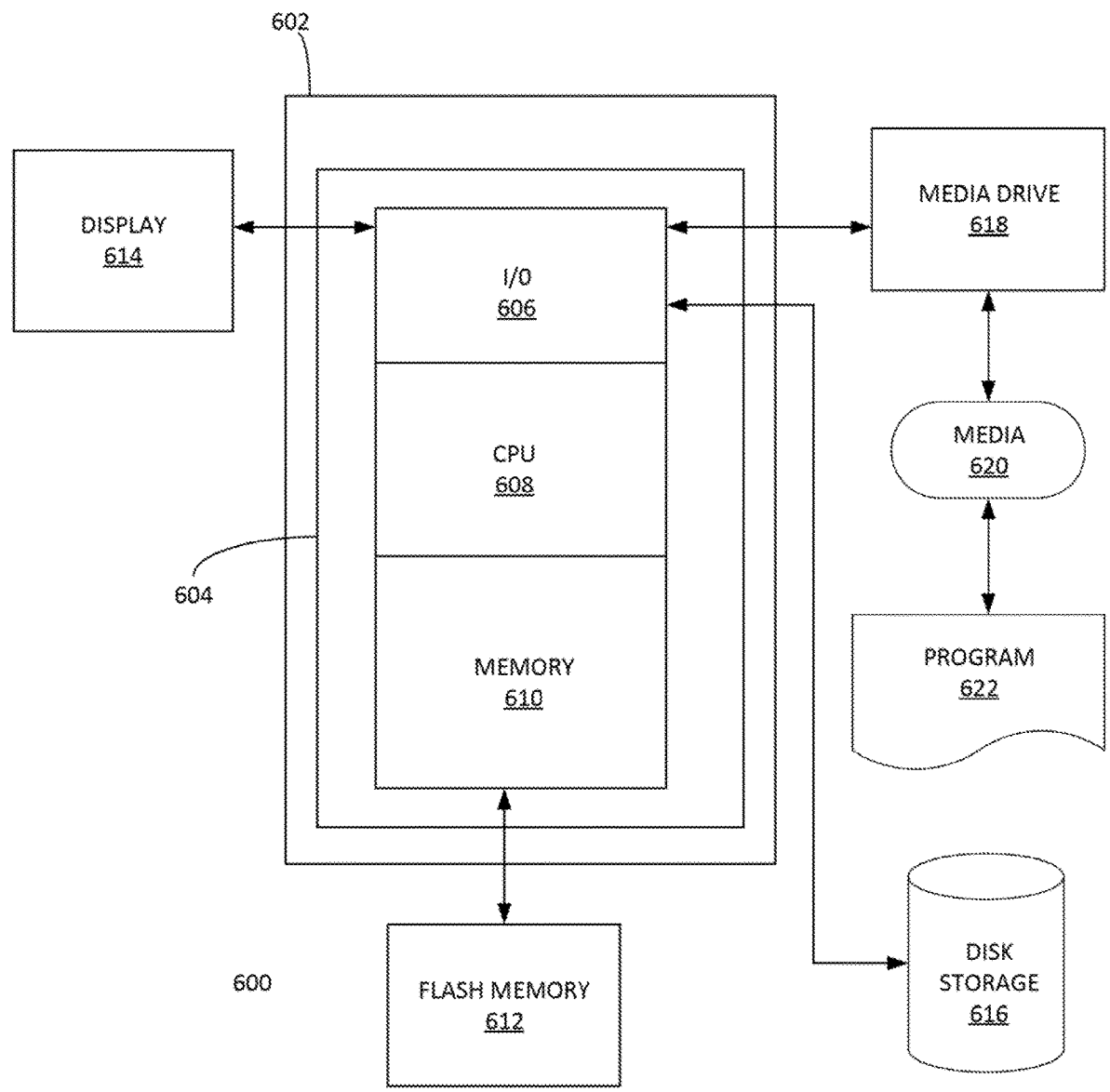
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. Computing system 600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method useful for bulk data migration with a dedupe file system comprising:
   providing a data-transfer appliance, wherein the data-transfer appliance comprises a specified number of hard drive data disks configured in a specified number of RAID (redundant array of independent disks) volumes in each individual RAID group, wherein the individual RAID group comprises at least one directory as a mountpoint of the individual RAID group, and wherein the directory has a flat hierarchy;
   creating a single dedupe mountpoint on the data-transfer appliance for a dedupe process,
   wherein the dedupe process communicates only with the single dedupe mountpoint;
   creating a single scalable namespace for all RAID volumes under the single dedupe mountpoint;
   wherein the single scalable namespace for deduplication is without a logical volume manager; and
   providing a number of writer threads, wherein each writer thread works with one RAID group assignment and the writer threads are evenly distributed across all RAID groups,
   wherein the writer thread comprises a thread in the dedupe process that listens on a socket for a plain text data and dedupes the plain text data, and
   wherein the writer thread encrypts and compresses the deduped plain text data before writing the deduped plain text data to a dedupe storage in the data-transfer appliance.

2. The computer-implemented method of claim 1, wherein the specified number of hard drive data disks comprises sixty (60) of the hard drive data disks.

3. The computer-implemented method of claim 2, wherein the RAID configurations comprises a number of RAID6 groups, each of fifteen (15) disks.

4. The computer-implemented method of claim 3, wherein each of the RAID6 groups comprises an ext4 file system.

5. The computer-implemented method of claim 3, wherein the RAID configurations comprises four (4) of the RAID6 groups, each of fifteen disks.

6. The computer-implemented method of claim 1, wherein the even distribution of the writer threads across the RAID6 groups provide storage usage across all the RAID groups.

7. A computer system comprising:
   a processor configured to execute the instructions;
   a memory containing the instructions when executed on the processor, causes the processor to perform operations that:
   provide a data-transfer appliance, wherein the data-transfer appliance comprises a specified number of hard drive data disks configured in a specified number of RAID (redundant array of independent disks) volumes in each RAID group, wherein each individual RAID group comprises at least one directory as a mountpoint of the individual RAID group, and wherein the directory has a flat hierarchy;
   create a single dedupe mountpoint on the data-transfer appliance for a dedupe process, wherein the dedupe process communicates only with the single dedupe mountpoint;
   create a single scalable namespace for all of the RAID volumes under the single dedupe mountpoint, wherein the single scalable namespace for deduplication is without a logical volume manager; and
   provide a number of writer threads, wherein each writer thread works with one RAID group assignment and the writer threads are evenly distributed across all RAID groups,
   wherein the writer thread comprises a thread in the dedupe process that listens on a socket for a plain text data and dedupes the plain text data, and
   wherein the writer thread encrypts and compresses the deduped plain text data before writing the deduped plain text data to a dedupe storage in the data-transfer appliance.

8. The computer system of claim 7, wherein the specified number of hard drive data disks comprises sixty (60) of the hard drive data disks.

9. The computer system of claim 8, wherein the RAID configurations comprises a number of RAID6 groups, each of fifteen (15) disks.

10. The computer system of claim 9, wherein each of the RAID6 groups comprises an ext4 file system.

11. The computer system of claim 10, wherein the RAID configurations comprises four (4) RAID6 groups, each of fifteen disks.

12. The computer system of claim 11, wherein the data-transfer appliance comprises an offline data-transfer appliance with one petabyte of storage.

13. The computer system of claim 12, wherein the offline data-transfer appliance comprises an operating system and one or more central processing units (CPU).

14. The computer system of claim 13,
    wherein the offline data-transfer appliance performs link aggregation and assigns itself an internet-protocol (IP) address, and
    wherein the even distribution of the writer threads across the RAID6 groups provide storage usage across all the RAID6 groups.

15. The computer system of claim 7, further comprising:
    with the writer thread, appends a transformed data (TD) until a size of a dedupe segment file is greater than a specified size.

16. The computer system of claim 15, wherein the specified size of the dedupe segment file is greater than eight gigabytes (8 GB).

\* \* \* \* \*